United States Patent [19]

Kanda et al.

[11] Patent Number: 5,523,850
[45] Date of Patent: Jun. 4, 1996

[54] PICTURE SIGNAL RECORDING DEVICE HAVING ADAPTIVE PROCESSING CIRCUIT FOR ADDING COLOR SIGNAL AND SUB-SAMPLED COLOR SIGNAL IN RESPONSE TO MOTION SIGNAL

[75] Inventors: Yuko Kanda; Yoshitaka Miyake; Hiroshi Yamagata, all of Kanagawa, Japan

[73] Assignee: Sony Corporation, Tokyo, Japan

[21] Appl. No.: 174,462

[22] Filed: Dec. 28, 1993

[30] Foreign Application Priority Data

Dec. 29, 1992 [JP] Japan ................................ 4-360012

[51] Int. Cl.$^6$ .......................... H04N 9/79; H04N 11/02
[52] U.S. Cl. .................. 358/310; 358/330; 348/392; 348/424; 348/427; 348/431
[58] Field of Search ................... 358/310, 330; 348/384, 391, 392, 399, 424, 425, 427, 428, 429, 430, 431, 713; H04N 9/79, 7/12, 11/02, 11/04, 5/92

[56] References Cited

U.S. PATENT DOCUMENTS

| | | | |
|---|---|---|---|
| 4,891,699 | 1/1990 | Hamada et al. | 348/424 |
| 5,043,798 | 8/1991 | Emori . | |
| 5,293,228 | 3/1994 | Mark | 348/391 |
| 5,335,071 | 8/1994 | Shin | 348/392 |
| 5,428,394 | 6/1995 | Yamagami et al. | 348/391 |

FOREIGN PATENT DOCUMENTS 0471517  2/1992  European Pat. Off. .

*Primary Examiner*—Thai Q. Tran
*Attorney, Agent, or Firm*—William S. Frommer; Alvin Sinderbrand

[57] ABSTRACT

A picture signal recording device for recording color video signals having a color signal detection circuit detects the quantity of motion of chroma signals from an inter-frame difference between a color difference signal from a chroma recording processing circuit and a signal delayed by one frame from the color difference signal. A dynamic change smoothing filter circuit smoothes sudden changes in the quantity of motion of the chroma signal. A luminance signal motion detection circuit detects the quantity of motion of chroma signals from an inter-field difference between a luminance signal from a luminance recording processing circuit and a signal delayed by one field from the luminance signal. A maximum value detection circuit detects the maximum value of the quantity of motion of the chroma signal and the quantity of motion of the luminance signal. An adaptive processing circuit controls the quantity of transmission of the sub-Nyquist sampled color signal depending on the maximum value. Thus the sub-sampled color signal sub-sampled responsive to the motion of the picture is transmitted, while motion detection may be made without necessitating a memory exclusively used for motion detection.

6 Claims, 13 Drawing Sheets

PICTURE SIGNAL RECORDING DEVICE HAVING ADAPTIVE PROCESSING CIRCUIT FOR ADDING COLOR SIGNAL AND SUB-SAMPLED COLOR SIGNAL IN RESPONSE TO MOTION SIGNAL

BACKGROUND OF THE INVENTION

This invention relates to a picture signal recording device employed for recording color video signals and, more particularly, to a picture signal recording device which may be employed with a video tape recorder adapted for recording chroma signals after conversion which have been converted into low-frequency signals.

In video tape recorders for household use, it is customary to translate chroma components contained in the picture signals into corresponding low-frequency signals, and to record the chroma signals, as converted into the corresponding low-frequency signals, simultaneously with frequency modulated luminance signals. The chroma signals are shifted to a frequency range of from 600 to 750 kHz during conversion into low-frequency signals, and the converted chroma signals have a narrow bandwidth on the order of several hundreds of kilohertz. The converted chroma signals having the narrow bandwidth are recorded simultaneously with frequency-modulated luminance signals. Thus the picture signals may be recorded efficiently on the video tape.

With the above-described picture signal recording device in which the converted chroma signals having the narrow bandwidth are recorded simultaneously with the frequency-modulated luminance signals, since the converted chroma signals are of the narrow frequency range on the order of several hundreds of kilohertz, the chroma signal components in playback signals are less satisfactory than the luminance signal components. That is, the picture quality is lowered due to imbalances of the frequency scale. In revising the standards for VTRs for household use, emphasis has actually been placed on increasing the frequency range of the luminance signals. However, for further improving the picture quality, it is thought to be necessary to improve the characteristics of the chroma signals, such as by increasing the frequency range of the converted chroma signals.

To this end, attempts have been made in sub-sampling or sub-Nyquist sampling the chroma signals for increasing the substantive frequency range of the chroma signals without significantly changing the recording frequency range on the recording medium, such as a video tape. The sub-sampling is a sampling which is performed with an offset along the time scale, such as field or frame offsetting, or with an offset on a two-dimensional plane, such as line offsetting.

Meanwhile, if the sub-sampling is to be performed with an offset along the time scale, such as field or frame offsetting, the picture quality for a moving picture is deteriorated due to the motion along the time scale, although there is no deterioration in the picture quality for a still picture. Consequently, it is thought to be necessary to detect the motion of the picture and to perform adaptive control of the amount of sub-sampling with an offset along the time scale which depends on the quantity of detected motion.

If, however, quantity of the detected motion changes abruptly, the processing for the moving picture abruptly to change to processing for the still picture or vice versa, thus leading to edge flicker or similar defects.

OBJECT AND SUMMARY OF THE INVENTION

In view of the above-described state of the art, it is an object of the present invention to provide a picture signal recording device in which color signals are sub-sampled as a function of picture motion and in which the processing for the moving picture is changed over smoothly to that for the still picture or vice versa despite abrupt changes in the amount of the picture motion for eliminating artifacts such as edge flicker.

According to the present invention, there is provided a picture signal recording device comprising color signal motion detection means for detecting a first quantity of motion of color signals included in picture signals, luminance signal motion detection means for detecting a second quantity of motion of luminance signals included in the picture signals, synthesizing means for synthesizing the first quantity of motion and the second quantity of motion, means for sub-sampling the color signals, and adaptive control means for combining the color signals and the sub-sampled color signals.

Preferably, the detection of the motion quantity of the color signals is performed responsive to an inter-frame difference of the color signals, and the detection of the motion quantity of the luminance signals is performed responsive to an inter-field difference of the luminance signals.

The quantity of transmission of the sub-sampled color signals cannot be controlled based on an inter-field difference of the color signals because the inter-field difference cannot be observed on the reception side. Besides, if the quantity of transmission of the sub-sampled color signals is control led responsive only to an inter-frame difference of the color signals, the probability of mistaken detection is increased. On the other hand, if the quantity of transmission of the sub-sampled color signals is control led responsive to the difference between two frames of the color signals, the memory as required is increased in capacity. If the quantity of transmission of the sub-sampled color signals is controlled responsive only to an inter-field or inter-frame difference of the luminance signals, mistaken control results because changes in the luminance signals are not necessarily coincident with those in the color signals. It is therefore desirable to control the quantity of transmission of the sub-sampled color signals responsive to the inter-frame difference of the color signals and the inter-field difference of the luminance signals.

Preferably, the quantity of transmission of sub-sampled color signals by the adaptive processing means is controlled depending on the maximum value or the sum of the first quantity of motion of the color signals and the second quantity of motion of the luminance signals. It is therefore desirable for the synthesizing means to find the maximum value or the sum of the first quantity of motion of the color signals and the second quantity of motion of the luminance signals.

According to the present invention, there is provided a picture signal recording device comprising picture signal motion detection means for detecting a quantity of motion of picture signals, filter means for smoothing changes in the quantity of motion as detected by the picture signal motion detection means, means for sub-sampling the picture signals and adaptive processing means for combining the picture signals and the sub-sampled picture signals as a function of the smoothed quantity of motion from the filter means.

The filter means for smoothing the changes in the quantity of motion is preferably an FIR filter or an enhancement filter and preferably acts in the horizontal direction or in the vertical direction.

The picture signals include color signals, and the sub-sampling for the color signals is preferably a sub-Nyquist sampling. The proportion in which the sub-Nyquist sampled color signals and the color signals not sampled with sub-Nyquist sampling but sampled only by Nyquist sampling are combined is changed responsive to an output of the synthesizing means.

According to the picture signal recording device of the present invention, in which the frequency bandwidth of the picture signals is increased using sub-sampling in the direction of the time scale, the quantity of motion of the luminance signals as detected by the luminance signal motion detection means and the quantity of motion of the color signals as detected by the color signal motion detection means are synthesized by synthesizing means and the proportion of the sub-sampled color signals relative to the non-sub-sampled color signals is controlled based on the synthesized result, so that it becomes possible to produce color signals sub-sampled depending on the picture motion.

On the other hand, since the motion detection is performed by employing the inter-field difference of the luminance signals and the inter-frame difference of color signals, it becomes possible to effect motion detection on a practically unobjectionable level without providing any redundant memory exclusively used for motion detection.

In addition, according to the picture signal recording device of the present invention, in which the frequency bandwidth of the picture signals is increased using sub-sampling in the direction of the time scale, the changes in the quantity of motion of picture signals as detected by the picture signal motion detection means are smoothed by smoothing filter means, and the quantity of transmission of the sub-sampled color signals is controlled by the smoothed output by the adaptive processing means, so that the processing for moving pictures and that for still pictures may be changed over smoothly despite abrupt changes in the quantity of motion for eliminating the edge flicker or like defects.

Other objects and advantages of the present invention will become apparent from the following description.

DESCRIPTION OF THE PREFERRED EMBODIMENTS

Figure 1:
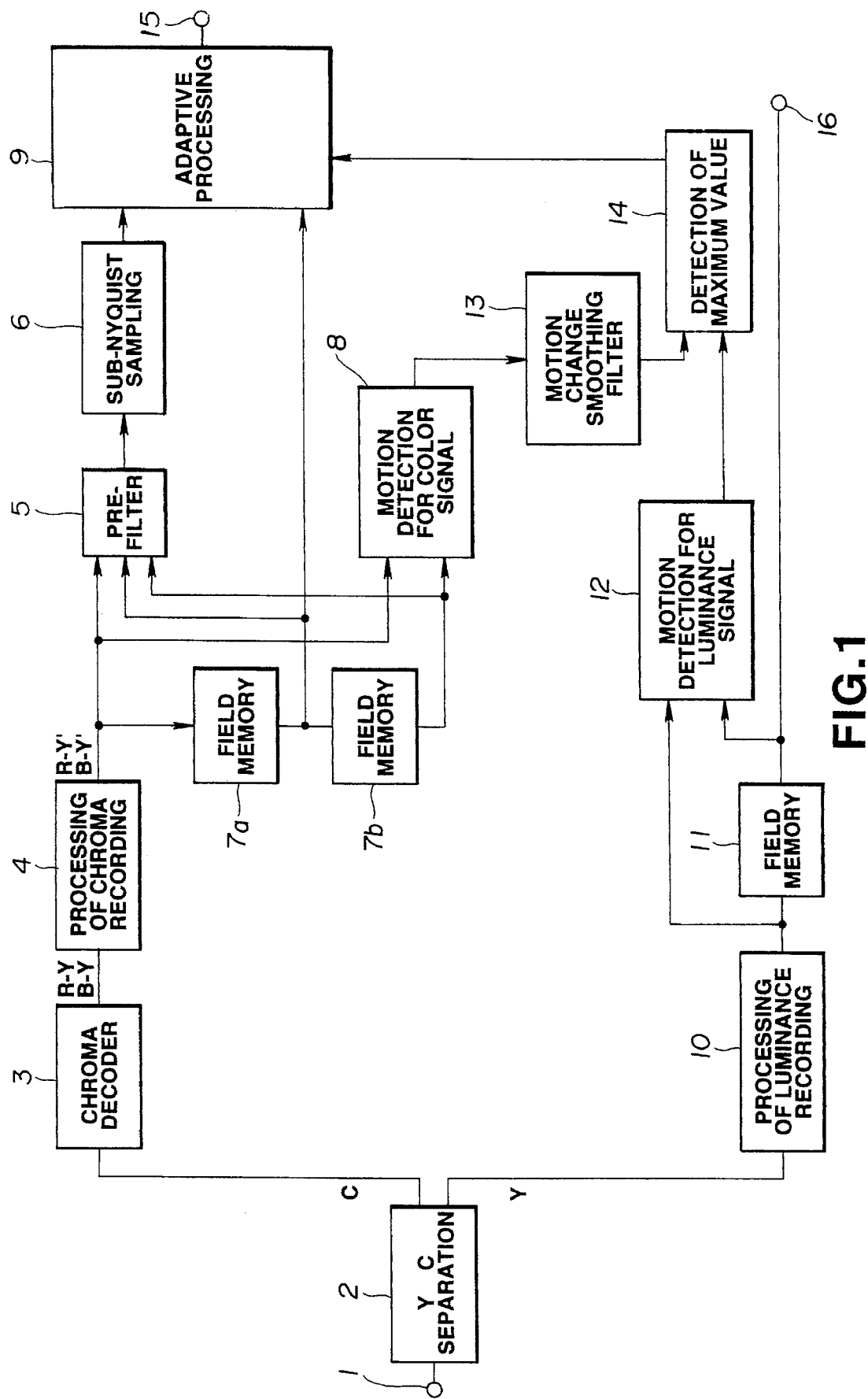
FIG. 1 is a block circuit diagram showing an arrangement of a picture signal recording device according to the present invention.

Referring to the drawings, a preferred embodiment of a picture signal recording device according to the present invention will be explained in detail.

Referring first to FIG. 1, the schematic arrangement of a video tape recorder as an embodiment of the video signal recording device according to the present invention is explained.

In FIG. 1, composite color video signals supplied to an input terminal 1 are separated by a luminance/chrominance separating circuit (YC separating circuit) 2 into luminance signals Y and chrominance signals (chroma signals) C.

The chroma signals C separated by the YC separating circuit 2 are supplied to a color difference decoder 3 which translates the chroma signals into color difference signals R-Y and B-Y. These color difference signals R-Y and B-Y are supplied to a chroma recording processing circuit 4. The chroma recording circuit 4 performs a pre-set chroma recording processing on the color difference signals R-Y and B-Y.

The chroma recording processed color difference signals R-Y' and B-Y' from the chroma recording processing circuit 4 are supplied to a pre-filter circuit 5, a field memory 7a and a color signal motion detection circuit 8 for detecting the quantity of motion present in the chroma signals.

An output of the field memory 7a is supplied to the pre-filter circuit 5, a field memory 7b and an adaptive processing circuit 9.

An output of the field memory 7b is supplied to the pre-filter circuit 5 and to the color signal motion detection circuit 8.

The pre-filter circuit 5 performs filtering on the color difference signals R-Y' and B-Y' in advance of sub-Nyquist sub-sampling to be applied to the color difference signals R-Y' and B-Y'. That is, the pre-filtering circuit 5 performs pre-filtering in e.g., the vertical direction, and along the time scale on the color difference signals R-Y' and B-Y' with the aid of the field memories 7a and 7b. The pre-filtered signals are supplied to a sub-Nyquist sampling circuit 6.

The pre-filtering by the pre-filtering circuit 5 comprises low-pass filtering aimed at preventing an error from occurring when a picture experiencing motion is sub-sampled by e.g., sub-Nyquist sampling, with an offset along the time scale. The pre-filtering is unnecessary when sub-sampling a still picture, that is, a picture completely free of motion.

The sub-Nyquist sampling circuit 6 performs sub-Nyquist sampling on signals filtered by the pre-filter circuit 5.

The sub-Nyquist sampling is explained with reference to FIG. 2.

Figures 2A, 2B, 2C, 2D:
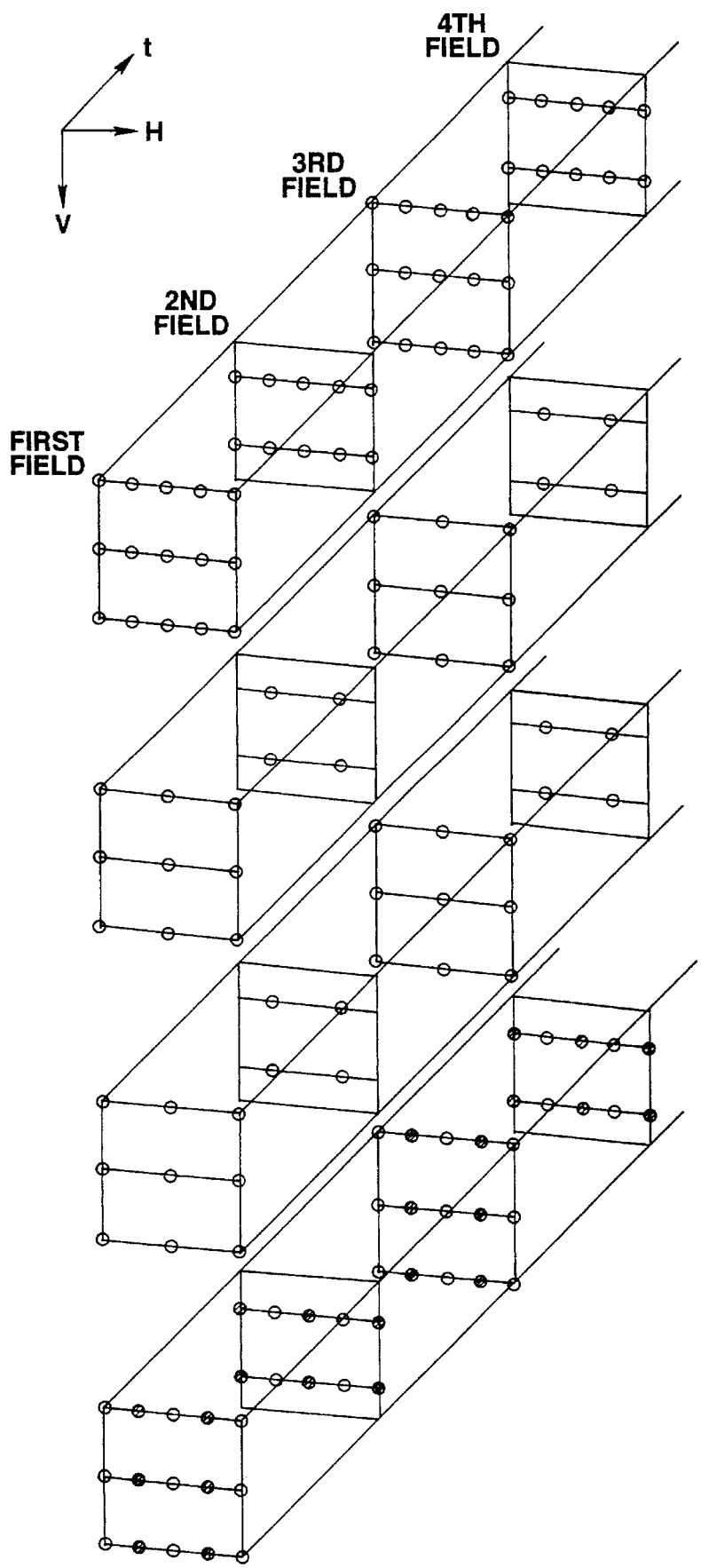
FIG. 2 illustrates the processing of sub-Nyquist sampling.

FIG. 2(A) shows four fields or two frames of the original picture. FIG. 2(B) shows the sub-Nyquist sampling performed by the sub-Nyquist sampling circuit 6 after pre-filtering by the pre-filtering circuit 5.

Meanwhile, the four-field original picture shown at (A) in FIG. 2 shows the state in which sampling points are sampled with an offset of 180° during a one-field interval from respective lines of the first to fourth fields.

FIG. 2 shows at (A) and (B) the manner of sub-Nyquist sampling during recording as described above. During replay, the sub-Nyquist sampling data of the replayed or received chroma signals shown at (C) in FIG. 2 are re-sampled, that is hatched pixels are added by interpolation, as shown at (D) in FIG. 4.

Returning to FIG. 1, the color signal motion detection circuit 8 detects the quantity of motion of chroma signals based on the difference between the color difference signals from the chroma recording processing circuit 4 and signals transmitted via the field memories 7a and 7b, also referred to as the inter-frame difference data.

Figure 3:
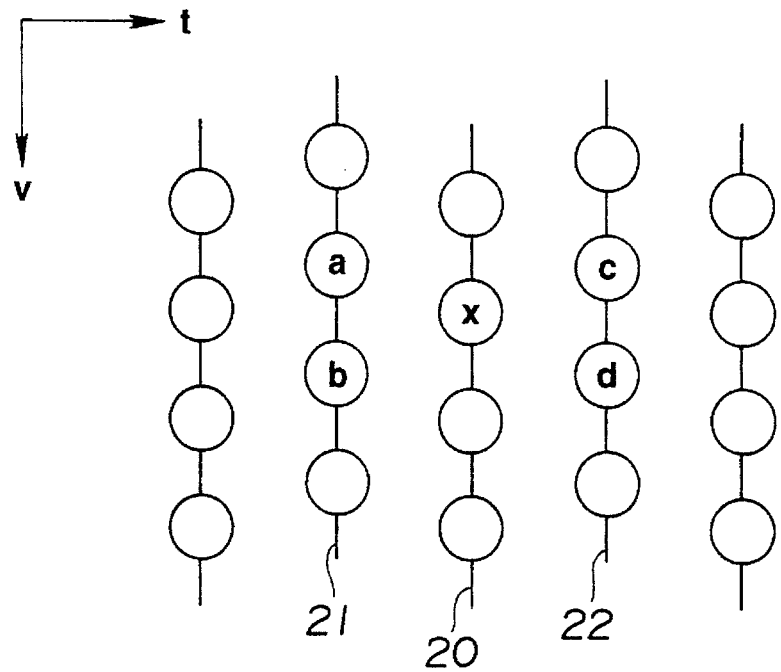
FIG. 3 illustrates motion detection by the inter-frame difference of chroma signals.
Figure 4:
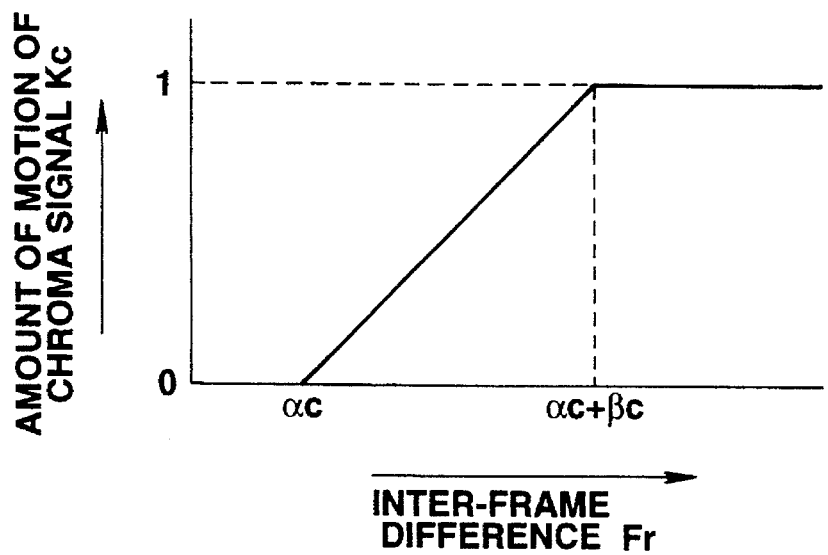
FIG. 4 is a graph showing the relation between the quantity of the motion of the chroma signals and the inter-frame difference of the chroma signals.

The principle of detection of the quantity of motion of the chroma signals by the color signal motion detection circuit 8 is explained by referring to FIGS. 3 and 4.

In FIG. 3, time t is plotted on the abscissa and a position v of a field picture is plotted on the ordinate. In FIG. 3, an inter-frame difference is found from the differential data between the pixels of a field 21 directly preceding the current field 20 (pre-field) having a pixel x for which the quantity of motion is to be detected and the pixels of a field 22 (post-field) directly following the current field 20.

Since the pre-field 21 and the post-field 22 have lines offset by ½ H in the vertical direction v, from the lines of the current field 20 as shown in FIG. 3, the inter-frame difference is calculated after finding mean values of the pixels separated by 1H from each other (in the vertical direction in FIG. 3), that is a mean value of pixels a and b of the pre-field 21 (a+b)/2 and a mean value of pixels c and d of the post-field 22 (c+d)/2.

The inter-frame difference $F_r$ is found by $$F_r = ((a+b)/2) - ((c+d)/2) \qquad (1)$$

Using the inter-frame difference $F_r$ as defined in equation (1), the quantity of the motion $K_c$ of the chroma signals is given by $$\begin{aligned} K_c &= (|F_r| - \alpha_c)/\beta_c \\ &= (|((a+b)/2) - ((c+d)/2)| - \alpha_c)/\beta_c \end{aligned} \qquad (2)$$

where $0 \leq K_c \leq 1$.

The manner of change of the quantity of motion $K_c$ of the chroma signals indicated by the equation (2) with respect to the inter-frame difference $F_r$ indicated by the equation (1) is shown in FIG. 4.

That is, FIG. 4 shows characteristics of the quantity of motion $K_c$ of the chroma signals as plotted on the ordinate with respect to the inter-frame difference $F_r$ as plotted on the abscissa.

As may be seen from the equation (2), the quantity of motion $K_c$ of the chroma signals is zero when the inter-frame difference $F_r$ is changed from 0 to $\alpha_c$. When the inter-frame difference F is changed from $\alpha_c$ to $\alpha_c + \beta_c$, the quantity of motion $K_c$ of the chroma signals is changed linearly. Finally, if the inter-frame difference $F_r$ becomes larger than $\alpha_c + \beta_c$, the quantity of motion $K_c$ of the chroma signals becomes equal to unity. On the whole, the characteristics of the chroma signals $K_c$ with respect to the inter-frame difference $F_r$ become non-linear.

The color signal motion detection circuit 8 finds the inter-frame difference $F_r$ using equation (1), after which it finds the quantity of motion of the chroma signals $K_c$ using equation (2).

Returning to FIG. 1, the luminance signals Y separated by the YC separating circuit 2 are supplied to a luminance recording processing circuit 10 which performs various signal processing operations for recording, on the luminance signals Y. The luminance signals from the luminance recording processing circuit 10 are supplied to a field memory 11 and to a luminance signal motion detection circuit 12. The field memory 11 outputs the luminance signals stored therein at an output terminal 16 via the field memory 11.

The field memory 11 is a delay circuit for matching the timing between the luminance signals YFM and chroma signals.

The luminance signal motion detection circuit 12 detects the quantity of motion of the luminance signals using the difference between the luminance signals from the luminance recording processing circuit 10 and the luminance signals delayed by one field from the field memory 11, that is an inter-field difference.

Figure 5:
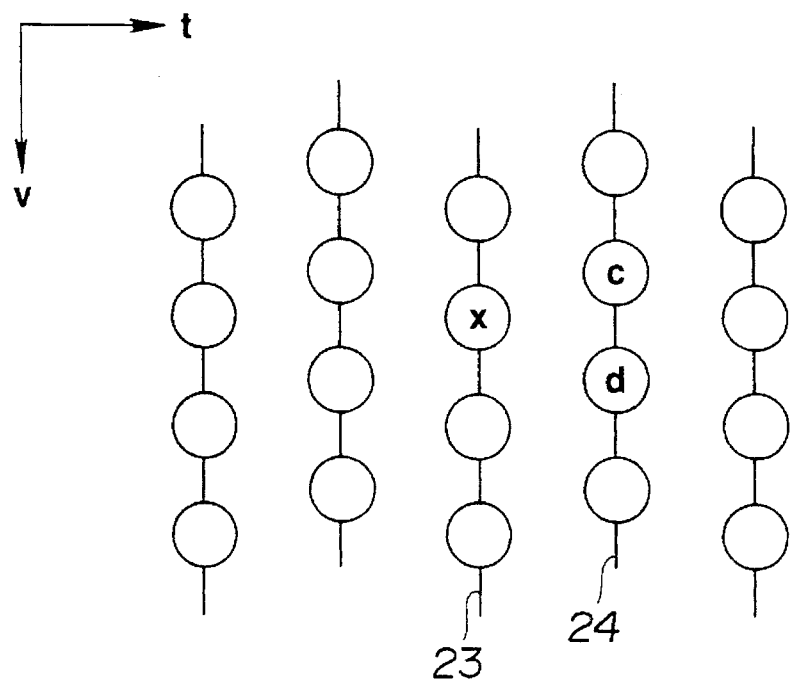
FIG. 5 illustrates motion detection by the inter-field difference of luminance signals.
Figure 6:
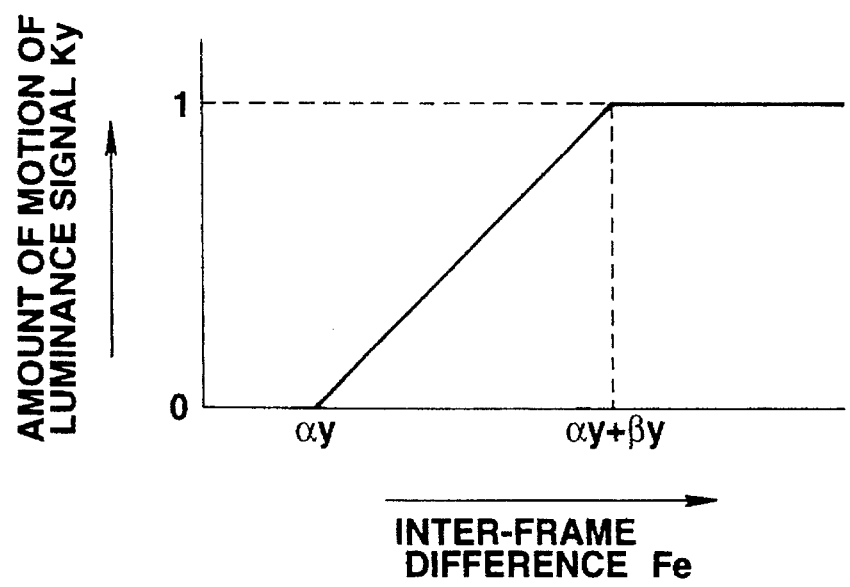
FIG. 6 is a graph showing the relation between the quantity of the motion of the luminance signals and the inter-field difference of the luminance signals.

The principle of detection of the quantity of motion of the luminance signals by the luminance signal motion detection circuit 12 is explained by referring to FIGS. 5 and 6.

In FIG. 5, time t is plotted on the abscissa and a position v of a field picture is plotted on the ordinate. In this figure, the inter-field difference is found from the difference of data of the pixels of a field 24 (post field) directly following the current field 23 representing the picture for which the quantity of motion is to be found.

Since the post-field 24 has lines offset by ½ H in the vertical direction v, from the lines of the current field 23 as shown in FIG. 5, the inter-field difference from the pixel x of the current field 23 is calculated after finding the mean value of two pixels c and d of the post-field 24.

The inter-field difference $F_e$ is then given by $$F_e = x - ((c+d)/2) \qquad (3)$$

Using the inter-field difference $F_e$ as defined in the equation (3), the quantity of motion $K_y$ of the luminance signals is given by $$\begin{aligned} K_y &= (|F_e| - \alpha_y)/\beta_y \\ &= (|(x - ((c+d)/2)| - \alpha_k)/\beta_k \end{aligned} \qquad (4)$$

where $0 \leq K_y \leq 1$.

The manner of change of the quantity of motion $K_y$ of the luminance signals indicated by the equation (4) with respect to the inter-frame difference $F_e$ indicated by the equation (3) is shown in FIG. 6.

That is, FIG. 6 shows characteristics of the quantity of motion $K_y$ of the luminance signals as plotted on the ordinate with respect to the inter-field difference $F_e$ as plotted on the abscissa.

As may be seen from the equation (4), the quantity of motion $K_y$ of the luminance signals is zero when the inter-field difference $F_e$ is changed from 0 to $\alpha_y$. When the inter-frame difference $F_e$ is changed from $\alpha_y$ to $\alpha_y + \beta_y$, the quantity of motion $K_y$ of the chroma signals is changed linearly. Finally, if the inter-field difference $F_e$ becomes larger than $\alpha_y + \beta_y$, the quantity of motion $K_y$ of the luminance signals becomes equal to unity. On the whole, the characteristics of the chroma signals $K_y$ with respect to the inter-frame difference $F_e$ become non-linear.

The luminance signal motion detection circuit 12 finds the inter-field difference $F_e$ using equation (3), after which it finds the quantity of motion of the luminance signals $K_y$ using equation (4).

The quantity of motion $K_c$ of the chroma signals in the picture signals is supplied to a dynamic change smoothing filter 13 which filters the quantity $K_c$ to smooth the change in the quantity of motion and which supplies the filtered quantity of motion of the chroma signals to a maximum value detection circuit 14.

The circuit 12 supplies quantity of motion $K_y$ of the luminance signals to the maximum value detection circuit 14.

The maximum value detection circuit 14 comprises synthesizing means for synthesizing the quantity of motion $K_c$ of the chroma signals and the quantity of motion $K_y$ of the luminance signals and for outputting the result of synthesis as a synthesized quantity of motion K. Specifically, the maximum value detection circuit 14 outputs the maximum value of the sum of the quantity of motion $K_c$ of the chroma signals and the quantity of motion $K_y$ of the luminance signals as a synthesized quantity of motion K.

In more general terms, a maximum value of the sum of the quantity of motion $K_c$ of the chroma signals multiplied by m or $mK_c$ and the quantity of motion $K_y$ of the luminance signals multiplied by n or $nK_y$ may be found and outputted as the synthesized quantity of motion K. By suitably selecting the values of m and n, the quantity of motion of the chroma signals and the quantity of motion of the luminance signals may be weighted to emphasize the desired one of the quantities of motion relative to the other.

An adaptive processing circuit 9 adaptively processes sub-Nyquist sampled color signals from the sub-Nyquist sampling circuit 6 (sub-Nyquist sampled data) and Nyquist sampled color signals from the field memory 7a (Nyquist sampled data), that is, data not sampled by sub-Nyquist sampling, depending on the synthesized quantity of motion K from the maximum value detection circuit 14, and transmits the processing results at an output terminal 15.

Figure 7:
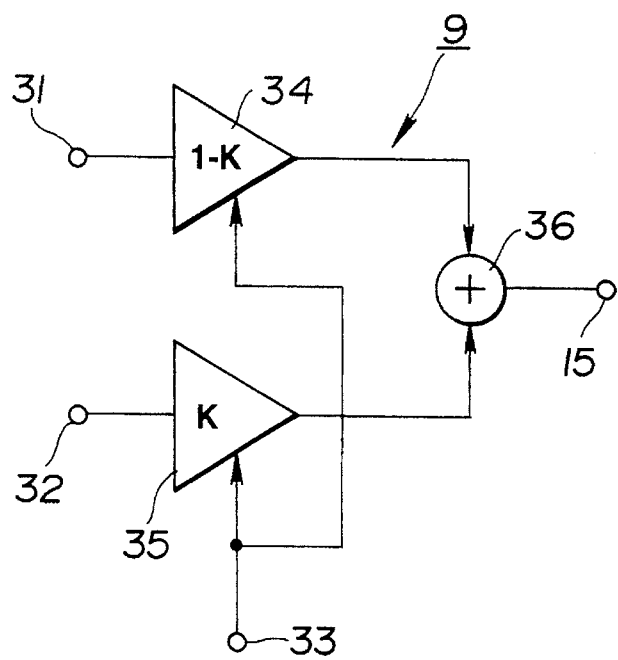
FIG. 7 illustrates a concrete construction of an adaptive processing circuit.

The arrangement of the adaptive processing circuit 9 is shown in FIG. 7.

The sub-Nyquist sampled data from the sub-Nyquist sampling circuit 6 shown in FIG. 1 is supplied to an input terminal 31. The Nyquist sampled data from the field memory 7a shown in FIG. 7a is supplied to an input terminal 32. The synthesized quantity of motion K from the maximum value detection circuit 14 is supplied to an input terminal 33.

The sub-Nyquist sampled data from the input terminal 31 is multiplied with a quantity (1−K) by a variable coefficient multiplier 34 and then supplied to an additive node 36. The Nyquist sampled data from the input terminal 32 is multiplied with the quantity K by a variable coefficient multiplier 35 and then supplied to the additive node 36. An output signal of the additive node 36 is outputted to a terminal 15.

The addition ratio is changed so that the proportion of the Nyquist sampled data from the input terminal 32 (color signals not sampled with sub-Nyquist sampling) is increased for a larger value of the synthesized quantity of motion K and, conversely, the proportion of the sub-Nyquist sampled data from the input terminal 31 (color signals sampled with sub-Nyquist sampling) is increased for a smaller value of the synthesized quantity of motion K. The two data are mixed at the additive node 36 and outputted to the terminal 16.

Thus, in the adaptive processing circuit 9, the quantity or level of the signal via a path inclusive of the sub-Nyquist sampling is determined by the coefficient (1−K) of the coefficient multiplier 34, while the quantity or level of the signal via a path not including the sub-Nyquist sampling is determined by the coefficient K of the coefficient multiplier 35, so that, by controlling the coefficients (1−K) and K depending on the motion detection output of the maximum value detection circuit 14, the proportions of the color signals sampled with sub-Nyquist sampling and the color signals not sampled with sub-Nyquist sampling may be controlled adaptively.

It is seen from above that, with the color signal system of the present VTR, the inter-frame difference is used for motion detection when the inter-field difference cannot be detected on the replay or reception side, whereas, with the luminance signal system, the inter-field difference containing a lesser amount of errors along the time scale is used for motion detection. The quantity of motion detected by the color signal system and that detected by the luminance signal system are synthesized by the maximum value detection circuit for producing a control signal for adaptively controlling the proportion of the sub-Nyquist sampling. It should be noted that the probability of mistaken detection is increased with solely the motion detection based on the inter-frame difference for the color signals, and more accurate motion detection may be achieved by taking into account the inter-frame difference of the luminance signals.

The synthesis of the motion detection output of color signals and the motion detection output of the luminance signals is not limited to selecting the maximum value thereof as performed by the maximum value detection circuit 14, but may also be a sum value as produced by a sum detection circuit, not shown.

That is, the proportion of the sub-Nyquist sampled data and the Nyquist sampled data summed together may be adaptively processed based on the sum value, for example, a weighted mean value of the quantity of motion of the color signals and the quantity of motion of the luminance signals.

The reason the quantity of motion $K_c$ of the chroma signals is supplied to the dynamic change smoothing filter 13 for smoothing changes in the quantity of motion will now be explained.

Figure 8A:
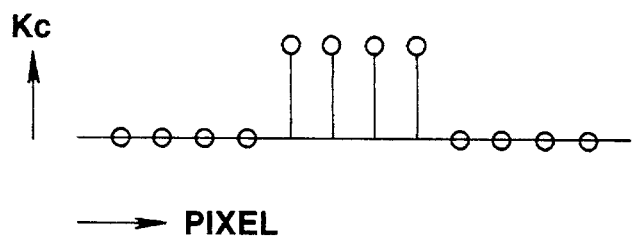
FIG. 8 shows the operation of a filter for smoothing changes in the quantity of the motion.

If the quantity of motion $K_c$ of the chroma signals detected by the color signal detection circuit 8 is changed abruptly between one pixel and the next pixel as shown in FIG. 8(A), the processing abruptly changes between processing for moving pictures and processing for still pictures, resulting in defects such as edge flicker and occurrence of a beat frequency. To avoid such an abrupt change the output $K_c$ of the color signal motion detection circuit 8 is supplied to the dynamic change smoothing filter 13 for producing characteristics shown for example in FIG. 8(B).

Figure 8B:
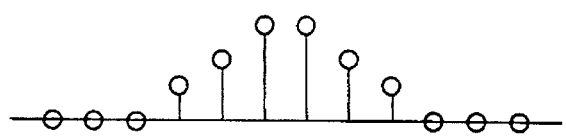

FIG. 8(B) shows output characteristics when an FIR filter is employed as the dynamic change smoothing filter.

Figure 8C:
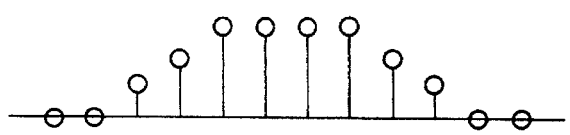

FIG. 8(C) shows output characteristics when an enhancement filter is employed as the dynamic change smoothing filter.

FIGS. 9 to 12 illustrate arrangements of the dynamic change smoothing filters.

Figure 9:
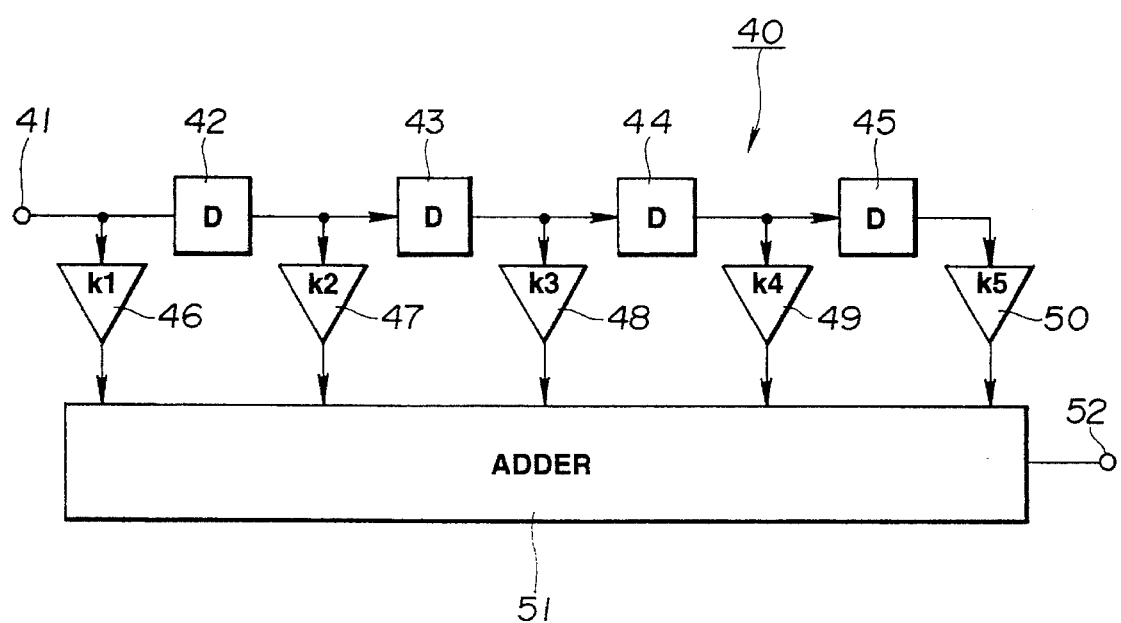
FIG. 9 illustrates an FIR filter to be applied to the quantity of the motion of color signals in the horizontal direction.

FIG. 9 shows a dynamic change smoothing filter 40 for smoothing the quantity of motion of color signals $K_c(n)$ in the horizontal direction using an FIR filter.

The dynamic change smoothing filter 40 sums and smoothes the quantity of motion $K_c(n)$ in the horizontal direction of pixel-based color signals entered at a terminal 41 at intervals n, n−1, . . . , n−4 respectively differing by the temporal duration of a pixel T.

The quantity of motion $K_c(n)$ is multiplied at a coefficient multiplier 46 with a coefficient $k_1$ to produce a product $k_1 K_c(n)$ which is supplied to an adder 51. The quantity of motion $K_c(n-1)$, delayed from the quantity of motion $K_c(n)$ by a delay unit 42, is multiplied at a coefficient multiplier 47 with a coefficient $k_2$ to produce a product $k_2K_c(n-1)$ which is supplied to the adder 51. The quantity of motion $K_c(n-2)$, further delayed from the quantity of motion $K_c(n)$ by a delay unit 43, is multiplied at a coefficient multiplier 48 with a coefficient $k_3$ to produce a product $k_3K_c(n-2)$ which is supplied to the adder 51. The quantity of motion $K_c(n-3)$, further delayed from the quantity of motion $K_c(n)$ by a delay unit 44, is multiplied at a coefficient multiplier 40 with a coefficient $k_4$ to produce a product $k_4K_c(n-3)$ which is supplied to the adder 51. The quantity of motion $K_c(n-4)$, further delayed from the quantity of motion $K_c(n)$ by a delay unit 45, is multiplied at a coefficient multiplier 50 with a coefficient $k_5$ to produce a product $k_5K_c(n-4)$ which is supplied to the adder 51.

The adder 51 sums the products $k_1K_c(n)$, $k_2K_c(n-1)$, $k_3K_c(n-2)$, $k_4k_c(n-3)$ and $k_5K_c(n-4)$ to smooth abrupt changes in the quantity of motion $K_c(n)$ in the horizontal direction of the color signals and outputs the resulting smoothed signal to a terminal 52.

Figure 10:
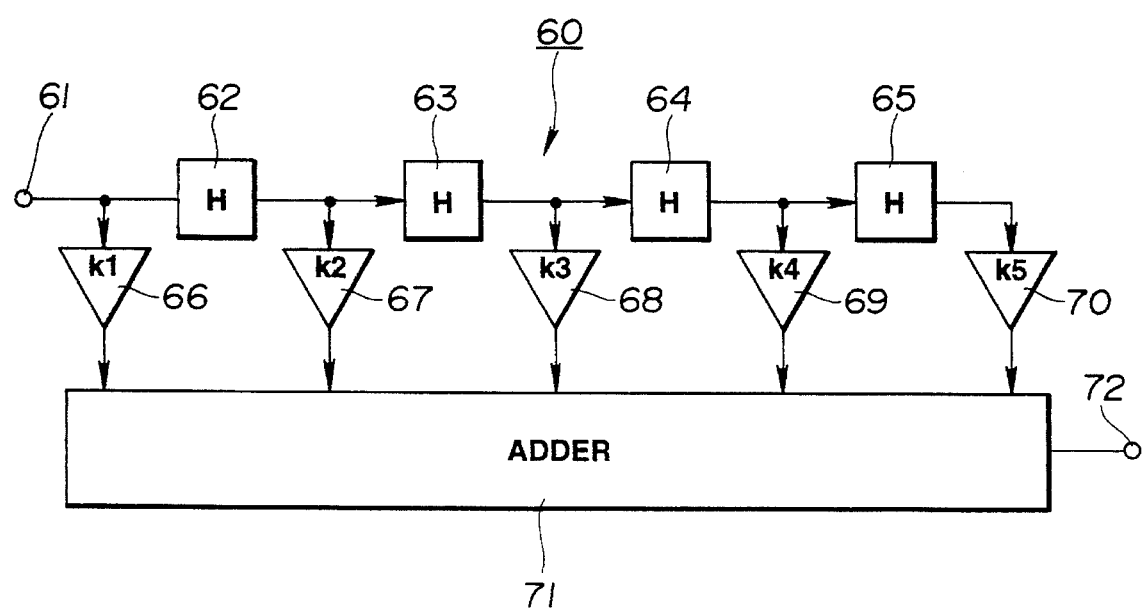
FIG. 10 illustrates the FIR filter to be applied to the quantity of the motion of color signals in the vertical direction.

FIG. 10 shows a dynamic change smoothing filter 60 for smoothing the quantity of motion of color signals $K_c(m)$ in the vertical direction using the FIR filter.

The dynamic change smoothing filter 60 sums and smoothes the quantity of motion $K_c(m)$ in the vertical direction of pixel-based color signals entered at a terminal 61 at intervals m, m-1, m-2, m-3, m-4 respectively differing by the temporal duration of a horizontal line H.

The quantity of motion $K_c(m)$ is multiplied at a coefficient multiplier 66 with a coefficient $k_1$ to produce a product $k_1K_c(m)$ which is supplied to an adder 71. The quantity of motion $K_c(m-1)$, delayed from the quantity of motion $K_c(m)$ by a 1- line (1H) delay unit 62, is multiplied at a coefficient multiplier 67 with a coefficient $k_2$ to produce a product $k_2K_c(m-1)$ which is supplied to the adder 71. The quantity of motion $K_c(m-2)$, further delayed from the quantity of motion $K_c(m)$ by a 1H delay unit 63, is multiplied at a coefficient multiplier 68 with a coefficient $k_3$ to produce a product $k_3K_c(m-2)$ which is supplied to the adder 71. The quantity of motion $K_c(m-3)$, further delayed from the quantity of motion $K_c(m)$ by a 1H delay unit 64, is multiplied at a coefficient multiplier 69 with a coefficient $k_4$ to produce a product $k_4K_c(n-4)$ which is supplied to the adder 71. The quantity of motion $K_c(m-4)$, further delayed from the quantity of motion $K_c(m)$ by a 1H delay unit 65, is multiplied at a coefficient multiplier 70 with a coefficient $k_5$ to produce a product $k_5K_c(m-4)$ which is supplied to the adder 71.

The adder 71 sums the products $k_1K_c(m)$, $k_2K_c(m-1)$, $k_3K_c(m-2)$, $k_4k_c(m-3)$ and $k_5K_c(m-4)$ to smooth abrupt changes in the quantity of motion $K_c(m)$ in the vertical direction of the color signals and outputs the resulting smoothed signal to a terminal 72.

Figure 11:
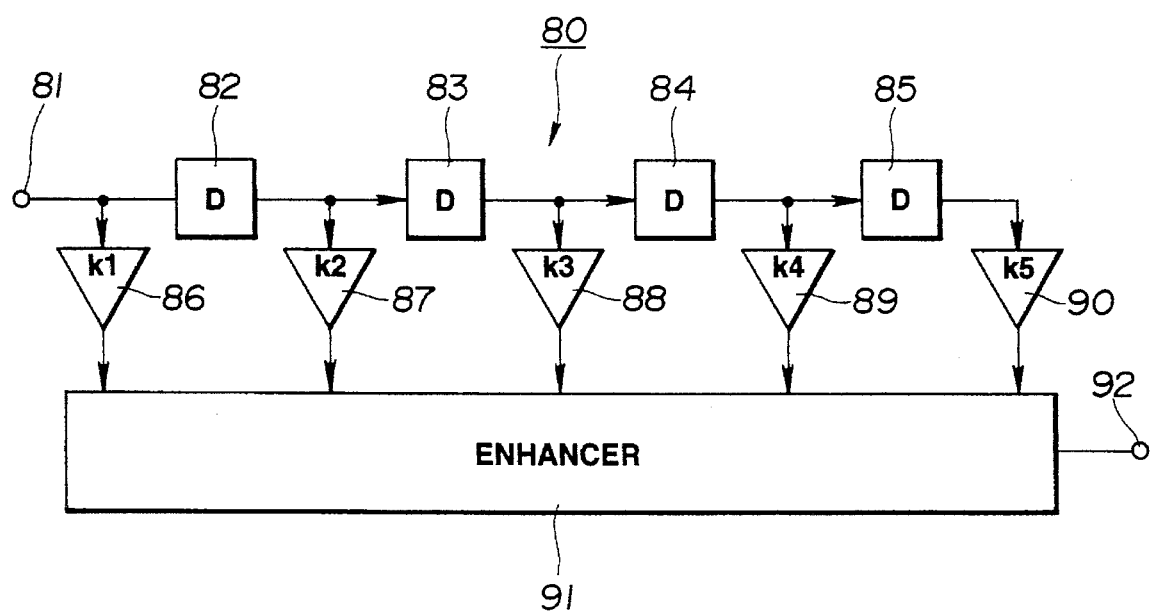
FIG. 11 illustrates an enhancement filter to be applied to the quantity of the motion of color signals in the horizontal direction.

FIG. 11 shows a dynamic change smoothing filter 80 for smoothing the quantity of motion of color signals $K_c(n)$ in the horizontal direction using an enhancement filter.

The dynamic change smoothing filter 80 enhances and smoothes the quantity of motion $K_c(n)$ in the horizontal direction of pixel-based color signals entered at a terminal 81 at intervals n, n-1, n-2, n-3, n-4 respectively differing by the temporal duration of a pixel T using an enhancing unit 91.

The quantity of motion $K_c(n)$ is multiplied at a coefficient multiplier 86 with a coefficient $k_1$ to produce a product $k_1K_c(n)$ which is supplied to an enhancer 91. The quantity of motion $K_c(n-1)$, delayed from the quantity of motion $K_c(n)$ by a delay unit 82, is multiplied at a coefficient multiplier 87 with a coefficient $k_2$ to produce a product $k_2K_c(n-1)$ which is supplied to the enhancer 91. The quantity of motion $K_c(n-2)$, further delayed from the quantity of motion $K_c(n)$ by a delay unit 83, is multiplied at a coefficient multiplier 88 with a coefficient $k_3$ to produce a product $k_3K_c(n-2)$ which is supplied to the enhancer 91. The quantity of motion $K_c(n-3)$, further delayed from the quantity of motion $K_c(n)$ by a delay unit 84, is multiplied at a coefficient multiplier 89 with a coefficient $k_4$ to produce a product $k_4K_c(n-3)$ which is supplied to the enhancer 91. The quantity of motion $K_c(n-4)$, further delayed from the quantity of motion $K_c(n)$ by a delay unit 85, is multiplied at a coefficient multiplier 90 with a coefficient $k_5$ to produce a product $k_5K_c(n-4)$ which is supplied to the adder 91.

The enhancer 91 enhances the products $k_1K_c(n)$, $k_2K_c(n-1)$, $k_3K_c(n-2)$, $k_4k_c(n-3)$ and $k_5K_c(n-4)$ to smooth abrupt changes in the quantity of motion $K_c(n)$ in the horizontal direction of the color signals and outputs the resulting smoothed signal to a terminal 92.

Figure 12:
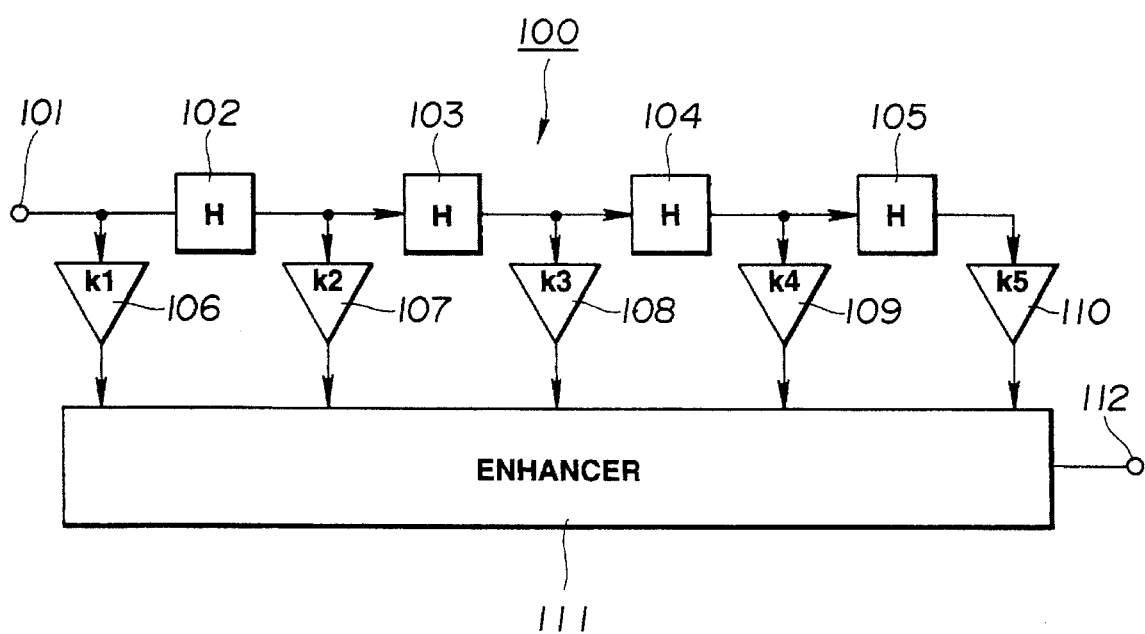
FIG. 12 illustrates the enhancement filter to be applied to the quantity of the motion of color signals in the vertical direction.

FIG. 12 shows a dynamic change smoothing filter 100 for smoothing the quantity of motion of color signals $K_c(m)$ in the vertical direction using an enhancement filter.

The dynamic change smoothing filter 100 enhances and smoothes the quantity of motion $K_c(m)$ in the vertical direction of pixel-based color signals entered at a terminal 101 at intervals m, m-1, m-2, m-3, m-4 respectively differing by the temporal duration of a horizontal line H.

The quantity of motion $K_c(m)$ is multiplied at a coefficient multiplier 106 with a coefficient $k_1$ to produce a product $k_1K_c(m)$ which is supplied to an enhancer 111. The quantity of motion $K_c(m-1)$, delayed from the quantity of motion $K_c(m)$ by a 1- line (1H) delay unit 102, is multiplied at a coefficient multiplier 107 with a coefficient $k_2$ to produce a product $k_2K_c(m-1)$ which is supplied to the enhancer 111. The quantity of motion $K_c(m-2)$, further delayed from the quantity of motion $K_c(m)$ by a 1H delay unit 103, is multiplied at a coefficient multiplier 108 with a coefficient $k_3$ to produce a product $k_3K_c(m-2)$ which is supplied to the enhancer 111. The quantity of motion $K_c(m-3)$, further delayed from the quantity of motion $K_c(m)$ by a 1H delay units 104, is multiplied at a coefficient multiplier 109 with a coefficient $k_4$ to produce a product $k_4K_c(m-3)$ which is supplied to the enhancer 111. The quantity of motion $K_c(m-4)$, further delayed from the quantity of motion $K_c(m)$ by a 1H delay unit 105, is multiplied at a coefficient multiplier 110 with a coefficients $k_5$ to produce a product $k_5K_c(m-4)$ which is supplied to the enhancer 111.

The enhancer 111' enhances the products $k_1K_c(m)$, $k_2K_c(m-1)$, $k_3K_c(m-2)$, $k_4k_c(m-3)$ and $k_5K_c(m-4)$ to smooth abrupt changes in the quantity of motion $K_c(m)$ in the vertical direction of the color signals and outputs the resulting smoothed signal at an output 112.

With the present VTR, the quantity of motion $K_c$ from the color signal motion detection circuit 8 is supplied to the dynamic change smoothing filter 13 comprising an FIR filter or an enhancement filter, whereby processing does not change abruptly between the processing for moving pictures and the processing for still pictures despite abrupt changes in the quantity of motion of the color signals in the horizontal direction $K_c(n)$ or in the quantity of motion in the vertical direction $K_c(m)$, thereby avoiding the occurrence of edge flicker or a beat frequency.

The dynamic change smoothing filter 13 may be connected downstream of the luminance signal motion detection circuit 12 or of the maximum value detection circuit 14.

The pre-filter circuit 5 may be considered as comprising the field memory 7a, the field memory 7b and a 1H delay unit, not shown.

Figure 13:
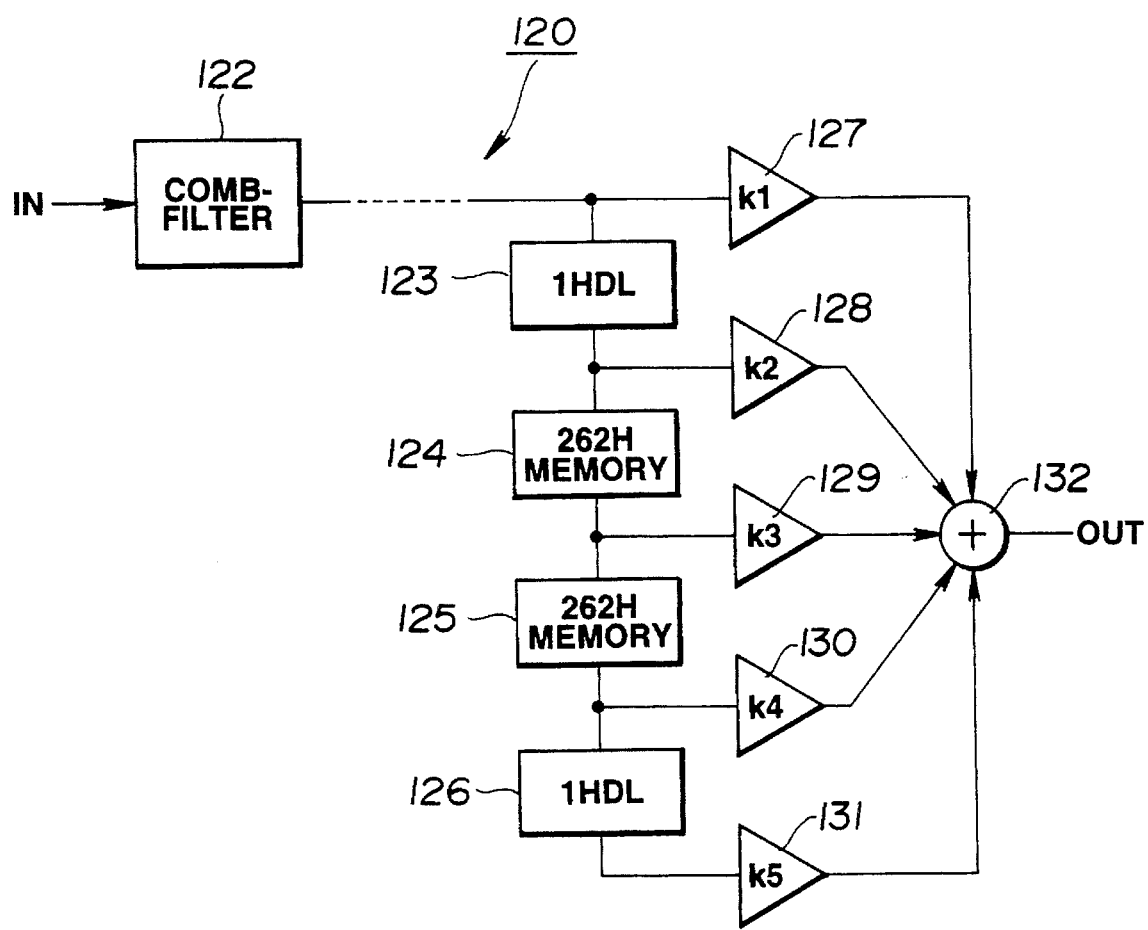
FIG. 13 illustrates an arrangement of a conventional pre-filter.

The pre-filter circuit 120, as shown in FIG. 13, is an example of a conventional arrangement which may be used as the pre-filter circuit 5.

That is, the conventional pre-filter circuit 120 includes a series connection of a 1H delay unit (1HDL) 123, a 262H delay unit (262H memory) 124, a 262H delay unit (262H memory) 125 and a 1H delay unit (1HDL) 126. Coefficient multipliers 127, 128, 129, 130 and 131 are respectively connected between an adder 132 and the input signal, without delay and as delayed by the delay units 123 to 126.

With the conventional pre-filter circuit 120, the picture quality is deteriorated in the vertical direction due to addition in the vertical direction by a 1H delay unit comprising a comb filter 122 and the 1H delay units 123 and 126.

Figure 14:
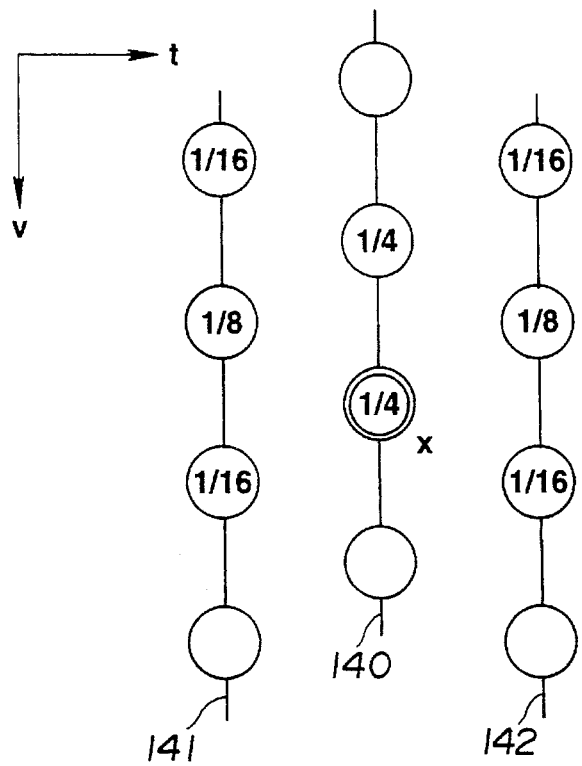
FIG. 14 illustrates the operation of the conventional pre-filter.

With the conventional pre-filter circuit 120, the comb filter 122 is of the type of 1:1 line-to-line addition and the coefficients $k_1$, $k_2$, $k_{36l}$, $k4$ and $k_5$ are such that $k_1=k_2=k_4=k_5=¼$ and $k_3=½$, the current field 140, the pre-field 141 and the post field 142 are as shown in FIG. 14. That is, output data x is spread in the spatial direction by the comb filter 122 to produce color spreading of 0.5 H.

Figure 15:
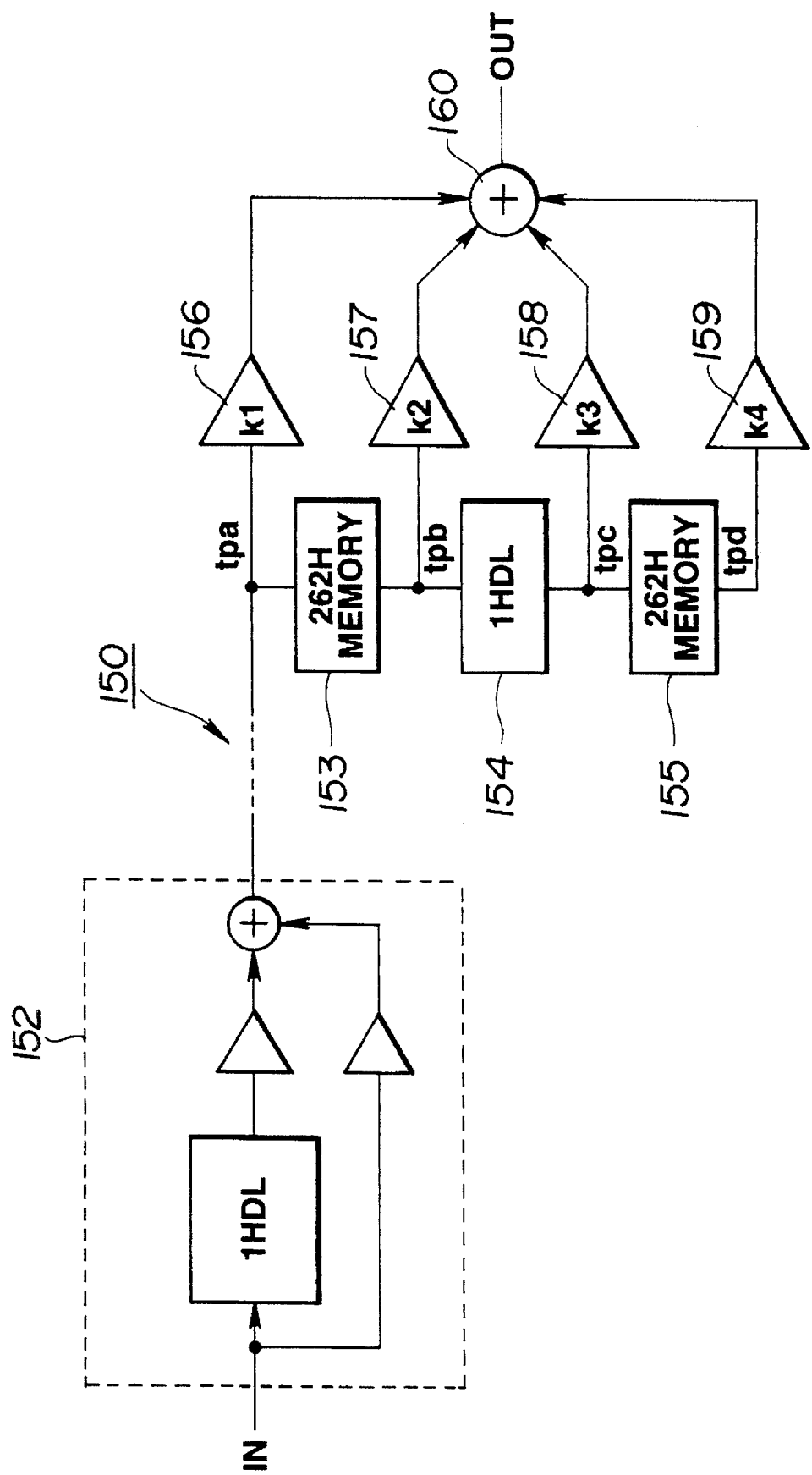
FIG. 15 illustrates an arrangement of a pre-filter circuit employed in the present invention.

A pre-filter circuit 150 according to the present invention is shown in FIG. 15, and comprises a comb filter 152 having an 1H delay unit (1HDL) employed for Y/C separation.

As shown in FIG. 15, data is delayed by about 1H by the comb filter 152 having 1H delay unit (1HDL) and added to vertically adjacent data, after which it is passed through a serially connected 262H delay unit (262H memory) 153, a 1H delay unit (1HDL) 154 and a 262H delay unit (262H memory) 155. The filtered and delayed filtered data are obtained at output taps $tp_a$, $tp_b$, $tp_c$ and $tp_d$ and respectively are multiplied by coefficient multipliers 156, 157, 158 and 159 having coefficients $k_1$, $k_2$, $k_3$ and $k_4$. The resulting products are summed at an adder 160 and outputted as an output sum signal.

Figure 16:
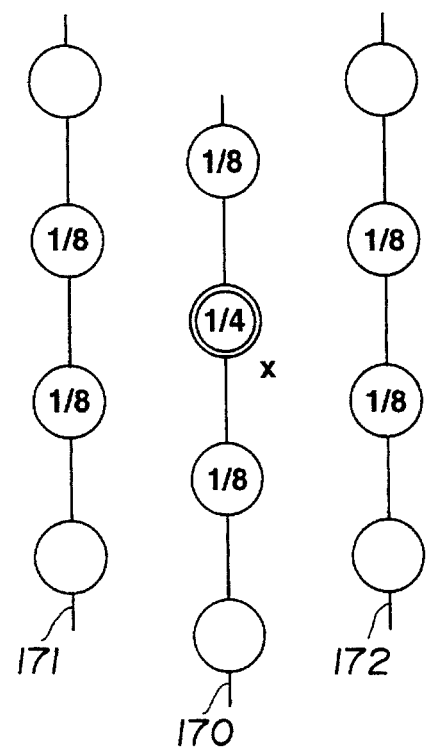
FIG. 16 illustrates the operation of the pre-filter circuit employed in the present invention.

FIG. 16 shows the current field 170, the pre-field 171 and the post field 172, where $k_1=k_2=k_3=k_4=k_5=¼$. The output data x has improved (reduced) spatial spreading and the luminance signals and the chroma signals are coincident in the position of center of gravity, while color spreading is also not produced.

Figure 17:
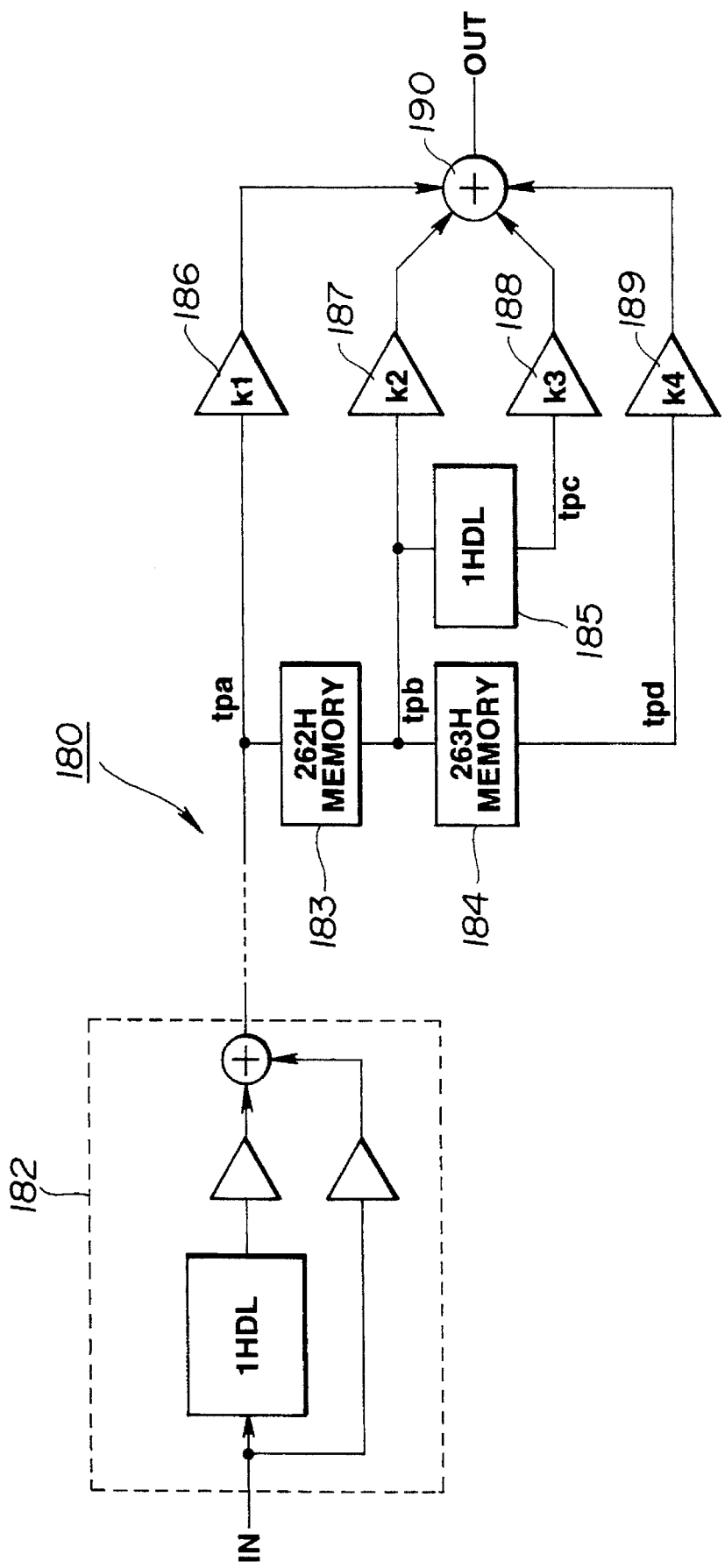
FIG. 17 illustrates a modified arrangement of a pre-filter circuit employed in the present invention.

FIG. 17 shows a modification of the pre-filter circuit 150 shown in FIG. 15.

As shown in FIG. 17, data is supplied to a comb filter 182 including a 1H delay unit (1HDL) to produce a mean value of pixels of a line (H). The comb filtered data is passed through a 262H delay unit (262H memory) 183, a 1H delay unit (1HDL) 185 and a 262H delay unit (262 memory) 184, in this order to output taps $tp_a$, $tp_b$, $tp_c$ and $tp_d$. These taps $tp_a$, $tp_b$, $tp_c$ and $tp_d$ are multiplied by coefficients $k_1$, $k_2$, $k_3$ and $k_4$ by coefficient multipliers 186, 187, 188 and 189 and resulting products are summed together at an adder 190 and outputted at a terminal 190.

With the present VTR, the pre-filter may be constituted by the comb filter having the 1H delay unit employed for the Y/C separating circuit 2, as a result of which the picture quality is not deteriorated in the vertical direction and the luminance signals and the chroma signals are coincident in the position of center of gravity.

It is to be noted that the present invention is not limited to the illustrated embodiment. For example, the combined motion quantity may be detected from the motion quantity of the chroma signals and that of the luminance signals by the combination of the detection of the maximum value and that of the sum value.

What is claimed is:

1. A picture signal recording device comprising:

means for receiving picture signals including color signals and luminance signals, color signal motion detection means for detecting a first quantity of motion of said color signals, luminance signal motion detection means for detecting a second quantity of motion of said luminance signals, synthesizing means for synthesizing said first quantity of motion and said second quantity of motion, means for sub-sampling said color signals, and adaptive control means for combining said color signals and the sub-sampled color signals in proportion to the synthesized first and second quantities of motion.

2. The picture signal recording device as claimed in claim 1 wherein said color signal motion detection means is responsive to an inter-frame difference of said color signals and said luminance signal motion detection means is responsive to an inter-field difference of said luminance signals.

3. The picture signal recording device as claimed in claim 1 wherein said synthesizing means is operative to synthesize said first and second quantities of motion by one of selecting a maximum value of said first and second quantities of motion and generating a sum of said first and second quantities of motion.

4. The picture signal recording device as claimed in claim 1 wherein said means for sub-sampling is operative to sub-Nyquist sample said color signals.

5. The picture signal recording device as claimed in claim 1, wherein said synthesized first and second quantities of motion is represented as a first value K between 0 and 1, and said adaptive control means includes first means for weighting said color signals by said first value, second means for weighting said sub-sampled color signals by a second value 1−K, and means for adding the weighted color signals and the weighted sub-sampled color signals.

6. The picture signal recording device as claimed in claim 1, further comprising comb filter means for filtering said color signals, first memory means for delaying the comb filtered color signals by a first interval of duration 262 horizontal lines to produce first delayed color signals, second memory means for delaying said first delayed color signals by a second interval of duration one horizontal line to produce second delayed color signals, third memory means for delaying said second delayed color signals by a third interval of duration 262 horizontal lines to produce third delayed color signals, and means for combining said comb filtered color signals and said first, second and third delayed color signals to produce pre-filtered color signals which are supplied to said means for sub-sampling.

* * * * *